United States Patent [19]
Sato

[11] 3,727,528
[45] Apr. 17, 1973

[54] PHOTOGRAPHIC CAMERA HAVING AUTOMATIC EXPOSURE CONTROL
[75] Inventor: Masanobu Sato, Tokyo, Japan
[73] Assignee: Olympus Optical Co., Ltd., Tokyo, Japan
[22] Filed: Oct. 20, 1970
[21] Appl. No.: 82,307

[30] Foreign Application Priority Data
Oct. 22, 1969 Japan.............................44/100548

[52] U.S. Cl.................................................95/10 C
[51] Int. Cl..............................................G01j 1/42
[58] Field of Search..............95/10 C, 10 CE, 10 CT

[56] References Cited
UNITED STATES PATENTS

| | | | |
|---|---|---|---|
| 3,173,350 | 3/1965 | Steisslinger | 95/10 C X |
| 3,085,486 | 4/1963 | Bushman | 95/64 D |
| 2,993,422 | 7/1961 | Rentschler | 95/10 C |
| 3,075,441 | 1/1963 | Maitani | 95/10 C |
| 3,106,882 | 10/1963 | Maitani | 95/10 C |
| 3,555,986 | 1/1971 | Pawlik | 95/10 CT |
| 3,286,610 | 11/1966 | Fahlenberg | 95/10 CT |
| 3,442,190 | 5/1969 | Erickson | 95/10 CT |
| 3,264,965 | 8/1966 | Rentschler | 95/53 |

Primary Examiner—John M. Horan
Assistant Examiner—Monroe H. Hayes
Attorney—Kelman and Berman

[57] ABSTRACT

Photographic camera having automatic exposure control of the type in which the shutter speed is selected by the operator, the operation of the shutter release being prevented when the scene brightness is excessive or insufficient for proper exposure at the selected shutter speed. The electric circuit of the camera consists of a photoelectric element, a galvanometer and a plurality of resistors each having a resistance corresponding to a shutter speed and selectively connected to the circuit in coupled relationship to the setting of the shutter speed to compensate for the indication of the galvanometer for proper exposure in accordance with the set shutter speed. The galvanometer is short-circuited or deenergized upon the setting of the shutter to the "bull" position or B-speed at which the shutter blades are kept opened upon actuation of the shutter release until the shutter is released thereby permitting the galvanometer to indicate the condition as if the intensity of light were insufficient for the proper exposure so that false exposure is positively prevented.

3 Claims, 10 Drawing Figures

PATENTED APR 17 1973 3,727,528

INVENTOR
Masanobu Sato
BY: Kelman and Berman
AGENTS

PHOTOGRAPHIC CAMERA HAVING AUTOMATIC EXPOSURE CONTROL

BACKGROUND OF THE INVENTION

The present invention relates to a photographic camera having automatic exposure control of the type in which the shutter speed is selected by the operator.

In a prior art photographic camera having automatic exposure control of the type described above, the operation of the shutter release is automatically prevented when the scene brightness is improper for the selected shutter speed, and the shutter speed must be readjusted so as to achieve proper exposure. However, when the shutter is inadvertently set to the B-speed at which the shutter blades are kept opened upon actuation of the shutter release, the shutter release can be operated resulting in a false exposure although a proper exposure might be obtained if the shutter were set to an appropriate speed.

In order to prevent false operation as described above, a locking means is provided in the prior art camera which prevents setting the shutter to the B-speed when the camera is used under automatic exposure control. However, the locking means must be unlocked manually when the camera is used with manual adjustment of the diaphragm opening thereby making the operation of the camera very troublesome.

The present invention aims at avoiding the above described disadvantages by advantageously utilizing the automatic exposure control mechanism of the camera.

The present invention also provides a shutter having a B-mechanism which is simple in construction and exact in operation.

SUMMARY OF THE INVENTION

An object of the present invention is to provide a photographic camera having automatic exposure control of the type in which the shutter speed is selected by the operator, which yet is simple in construction and exact in operation, and wherein the operation of the shutter release is positively prevented in order to avoid false exposure when the shutter is inadvertently set to the B-speed.

The above object is achieved in accordance with the present invention by the provision of an electric circuit for automatic exposure control in which the shutter speed is selected by the operator and the diaphragm opening is automatically adjusted for the proper exposure in accordance with the set shutter speed. When the intensity of light from the object is excessive or insufficient for proper exposure at the set shutter speed, the shutter release is automatically locked so as to prevent false exposure. The electric circuit comprises a photoelectric element, a galvanometer, and a plurality of resistors each having a resistance corresponding to a shutter speed, and a switch coupled with the shutter speed adjusting means to selectively connect one of the resistors to the electric circuit so that the indication of the pointer of the galvanometer is compensated for to achieve proper exposure in accordance with the set shutter speed. The electric circuit is characterized in that the galvanometer is short-circuited or deenergized by the actuation of switch coupled with the shutter speed adjusting means when the shutter speed adjusting means is set to the B-speed at which the shutter blades are kept opened upon actuation of the shutter release so that the pointer is moved to the position to which the pointer would be moved if the scene were too dark for proper exposure thereby positively preventing false exposure when the shutter speed adjusting means is inadvertently set to the B-speed under automatuc exposure control.

In accordance with the present invention, the B-mechanism of the shutter is very simple in costruction, yet it operates exactly. The B-mechanism comprises a first lever coupled with a shutter release member actuated by the shutter release so as to lock the governor mechanism of the shutter for porviding the shutter speeds when the release member providing actuated, and a second lever operatively coupled with the shutter speed adjusting means so that the second lever prevents the first lever from locking the governor mechanism when the shutter speed adjusting means is set to any of the shutter speeds except the B-speed. Thus, the governor mehcanism operates to provide the set shutter speeds, whereas, when the shutter speed adjusting means is set to the B-speed, the second lever is disengaged from the first lever so as to allow the same to lock the governor mechanism.

DETAILED DESCRIPTION OF THE PREFERRED EMBODIMENTS

Figure 1:
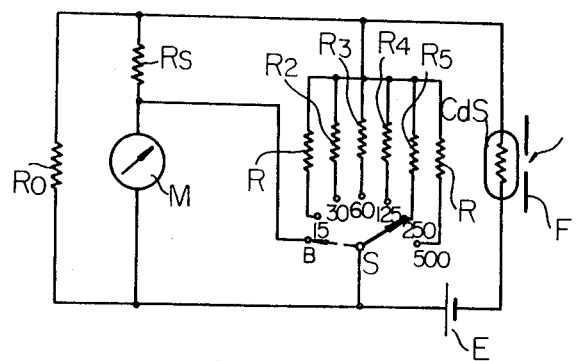
FIG. 1 is a diagram showing the electric circuit of a first embodiment of the present invention.

In FIG. 1 the electric circuit of a camera with automatic exposure control of the type in which the shutter speed is set selectively by the operator constructed in accordance with the present invention comprises a galvanometer M, a protective resistor $Rs$, a photoelectric element such as a cadmium sulfide cell (referred to as C-i dS hereinafter) and an electric source E connected in series in the circuit. Resistors $R_1 - R_6$ are connected in parallel across the series circuit consisting of the photoelectric element $CdS$ and the electric source E through a switch S which selectively connects one of the resistors $R_1 - R_6$ to the circuit. The switch S is coupled with the shutter speed dial (not shown) of the shutter and the resistance of each of the resistors $R_1 - R_6$ is so selected that the resistance of the resistor connected in the circuit when the shutter dial is set for a shutter speed selected from the speeds one-fifteenth, one-thirtieth, - - - one five-hundredths second, for example, corresponds to the set shutter speed thereby permitting the pointer of the galvanometer M to indicate the proper exposure. Resistor Ro connected in parallel with the photoelectric element CdS and stop F located in front of the photoelectric element CdS are used for adjusting for exposure factors such as the sensitivity of film and the filters mounted on the objective lens.

In accordance with the present invention, a terminal B is provided in the switch S and connected to the junction of the meter M and the protective resistor Rs so that, when the switch S is switched to the terminal B in coupled relationship with the setting of the shutter speed dial to B-speed at which setting the meter M is shortcuited.

Figure 3:
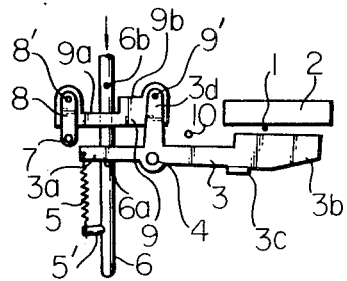
FIG. 3 is a schematic fragmentary view showing the mechanism for preventing actuation of the shutter release rod when the scene brightness is improper for exposure at the selected shutter speed.
Figure 4:
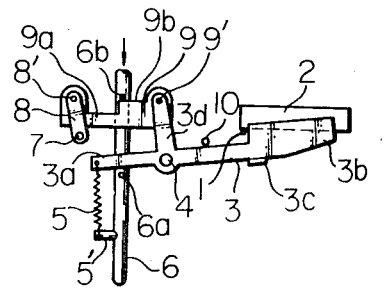
FIG. 4 is a view similar to FIG. 3 but showing the mechanism in the position preventing the actuation of the shutter release.

FIG. 3 illustrates the mechanical arrangement of parts. As shown, an abutment plate 2 is so set that the pointer 1 of the galvanometer M moves closely along the lower edge of the plate 2. A pointer arresting lever 3 is swingably pivoted by shaft 4 secured to a stationary element of the camera. The pointer arresting portion 3b of the lever 3 is located beneath the path of the pointer 1 so that, when the lever 3 is swung counterclock-wise, as viewed in FIG. 3, the pointer arresting portion 3b urges the pointer 1 against the abutment plate 2. The pointer arresting portion 3b is slightly shorter than the range of movement of the pointer 1 so that, when the pointer 1 is at its extremities of movements the pointer arresting portion 3b does not engage with the pointer 1 and can move beyond the path of movement of the pointer 1. The position of the shaft 4 with respect to the position of the pointer arresting portion 3b is so determined that the angular position of the lever 3 at which the pointer arresting portion 3b arrests the pointer varies depending upon the position of the pointer 1 so that the angular position of the lever 3 is correlated to the indication of the meter M.

One end of a spring 5 is secured to pin 5' fixed to the shutter release rod 6 while the other end of spring 5 is secured to the other arm 3a of the lever 3 as shown, so that the lever 3 is biased counterclock-wise but the pointer arresting portion 3b does not engage with the pointer 1 as long as the release rod 6 is not depressed. The rotation of the lever 3 is limited by a stopper pin 6a secured to the release rod 6. The free end of a third, lateral arm 3d of the lever 3 near the pivot shaft 4 is pivotably connected by pin 9' to one end of a connecting link 9 while the other end of the link 9 is pivotally connected by a pin 8' to the free end of a lever 8 which is rotatably supported by a pin 7 secured to a stationary element of the camera so that the connecting link 9 can move toward the left or the right depending upon the rotation of the pointer arresting lever 3.

The lever 3 is provided with a lug 3c which is operatively coupled with the diaphragm adjusting means so that the diaphragm opening of the objective lens is adjusted in accordance with the angular position of the lever 3 when it arrests the pointer 1 and, hence, with the indication of the pointer 1 of the meter M.

The connecting link 9 is provided with a recessed upper side edge 9a and a raised upper side edge 9b as shown and a pin 6b secured to the release rod 6 is adapted to engage with either of the edges 9a, 9b when the release rod 6 is depressed. The height of the raised edge 9b is so selected that, when the pin 6b engages with the raised edge 9b, the release rod 6 is prevented from actuating the shutter.

In oepration, the shutter speed is set by the operator so that one of the resistors $R_1 - R_6$ corresponding to the set shutter speed is connected in the cirucit by the switch S.

When the release rod 6 is depressed when brightness is adequate for the selected shutter speed, the pointer arresting lever 3 is rotated counterclockwise by the spring 5 until the pointer 1 is arrested between the pointer arresting portion 3b and the abutment plate 2 so as to keep the lever 3 in the angular position determined by the position of the pointer. The pin 6b of the release rod 6 can move into the recessed edge 9a of the link 9 because of the limited movement of the link 9 toward the left by the engagement of the pointer arresting portion 3b with the pointer 1. At the same time, the lug 3c adjusts the diaphragm opening of the objective lens in accordance with the angular position of the lever 3 and proper exposure is obtained.

If the scene brightness is excessive or insufficient for proper exposure at the selected shutter speed, the pointer 1 moves out of range of the pointer arresting portion 3b when the shutter release rod 6 is depressed. Thus, the raised edge 9b of the link 9 moves into the path of movement of the pin 6b so that the movement of the rod 6 is limited to prevent the same from actuating the shutter.

Improper exposure is positively prevented even when the shutter speed dial is set to the B-speed, because the meter M is short-circuited, thereby moving the pointer 1 out of the range of the pointer arresting portion 3b when the shutter speed dial is set to B-speed as previously described.

Figure 2:
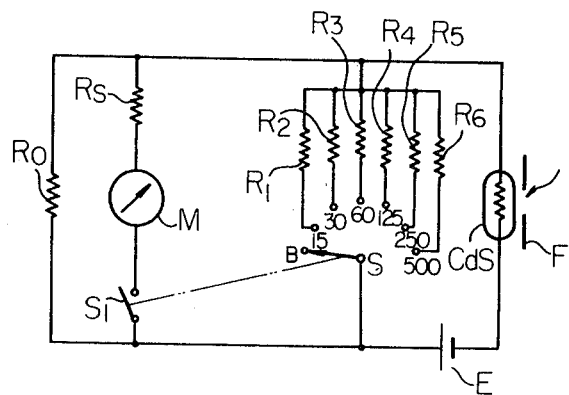
FIG. 2 is a diagram showing another embodiment of the electric circuit of the present invention.

FIG. 2 shows a modification of the electric circuit of FIG. 1. In the embodiment of FIG. 2, the switch S is coupled with a normally closed switch $S_1$ connected in series with meter M so that, when the switch S is switched to the terminal B by the setting of the shutter speed dial to the B-speed, the switch $S_1$ is opened to deenergize the meter M thereby preventing improper exposure.

Figure 5:
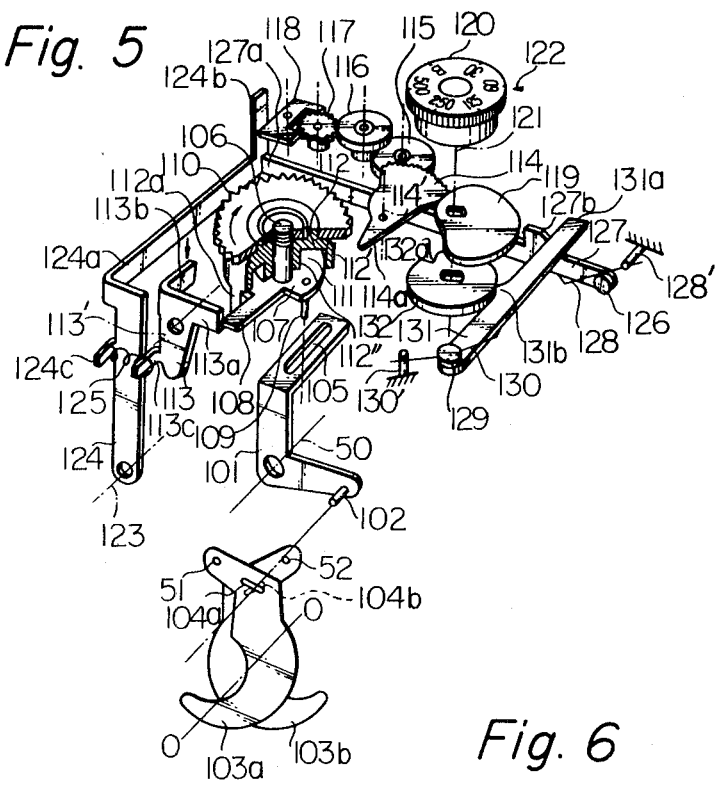
FIG. 5 is a schematic perspective view of a shutter according to the present invention.

FIG. 5 shows a shutter mechanism incorporated in the camera of the present invention.

Two shutter blades 103a, 103b are pivotally mounted by openings 51, 52, respectively. The shutter blades 103a, 103b are provided with elongated holes 104a, 104b, respectively, which are oppositely inclined so that the shutter blades 103a, 103b are opened and closed when a pin 102 engaging in the elongated holes 104a, 104b is moved upwardly and downwardly.

The pin 102 is secured to the free end of an L-shaped shutter blade actuating lever 101 which is pivoted about axis 50. Another arm of the lever 101 is provided with a rearwardly extending lug at its free end. An elongated hole 105 is formed in the rearwardly extending lug and a pin 109 secured to actuator disc 107 slidably engages the elongated hole 105. The actuator disc 108 is rotatably supported by a shaft 106 fixedly secured to the camera body so that, when the disc 107 is rotated, the lever 101 is reciprocally swung by the pin 109 engaging the hole 105 thereby permitting the shutter blades 103a, 103b to be opened and again closed.

A cylindrical member 112 having outer and inner cylindrical base portion 112′, 112″ is rotatably mounted on the shaft 106 above the actuator disc 107. A coil spring 111 is located in the annular recess formed by the base portions 112′ and 112″ and one end of the spring 111 is secured to the disc 107 while the other end of the spring 111 is secured to the member 112. A gear 110 is secured to the upper surface of the member 112.

The actuator disc 107 is provided with a projection 108 and a downwardly extending arm 122a is provided at the lower edge of the outer portion 112′ so that the arm 112a abuts against the projection 108 when the member 112 is rotated in either direction relative to the disc 107.

A release member 113 is pivotally mounted in the camera so as to swing about an axis 113′ adjacent to the disc 107. The member 113 is provided with arms 113a 113b at the upper end thereof and the arm 113b is depressed by the shutter release rod 6 of FIG. 3 as indicated by the arrow in FIG. 5 when the rod 6 is actuated so that the release member 113 is swung counterclockwise as viewed in the drawing. The arm 113a is normally held in the path of movement of the projection 108 of the disc 107, but, when the release member 113 is rotated counterclockwise by the release rod 6, the arm 113a is moved out of the path of movement of the projection 108 so as to free the rotation of the disc 107.

Thus, when the gear 110 is rotated together with the member 112 in the clockwise direction of the arrow by the camera setting mechanism (not shown) until the arm 112a abuts against the projection 108 while the disc 107 is prevented from rotating by the engagement of the projection 108 with the arm 113a, the spring 111 is energized to urge the disc 107 in the clockwise direction.

A sector gear 114 is pivoted about axis 114′ and biased in the clock-wise direction by a spring (not shown), and a shutter speed adjusting cam 119 secured to a shaft 121 are located adjacent to the sector gear 114 so that the side edge of the sector gear 114 engages with the cam 119. The location of the tail end 114a of the sector gear 114 in the path of movement of the projection 108 is adjusted according to the variation in the angular position of the cam 119 caused by means of the shutter speed dial 120 secured to te upper end of the shaft 121 so that the projection 108 abuts against the tail end 114a when the disc 107 is rotated. An index mark 122 provided on the camera body cooperates with the speed scale formed in the dial 120.

A governor mechanism consisting fof gears of 116, escapement wheel 117 and anchor 118 is coupled with he sector gear 114 so that the movement of the sector gear 114 caused by the abutment of the tail end 114a against the projection 108 during the rotation of the disc 107 is slowed to provide proper shutter speds in accordance with the adjustment of the dial 120.

A lever 124 is pivoted about an axis 123 adjacent to the release member 113 and one end of a spring 125 is secured to a lug 124c of the lever 124 while the other end of the spring 125 is secured to a lug the member 113 so that the lever 124 is urged toward the member 113. The uppr end of the lever 124 is formed with a rearwardly extending portion 124a having an upstanding lug 124b at its rearmost end. The upstanding lug 124b is normally spaced a short distance from the anchor 118 of the governor mechanism so as to permit the anchor 118 to be actuated freely, but, when the release member 113 is actuated, the lever 124 is swung in the clockwise direction by the spring 125 so that the upstanding lug 124b abuts against the anchor 118 so as to prevent the actuation of the governor mechanism.

Figure 6:
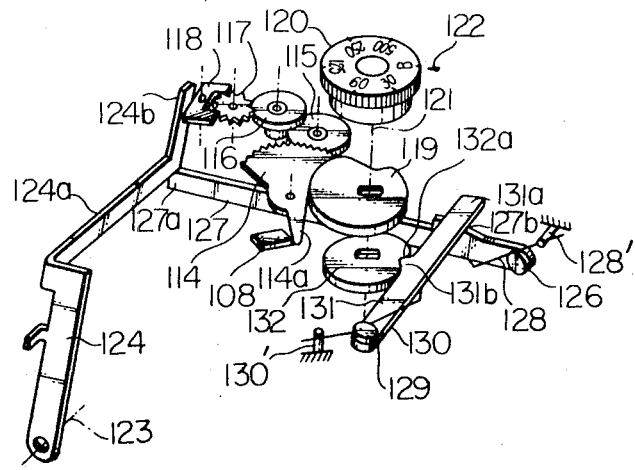
FIG. 6 is a fragmentary perspective view of the shutter shown in FIG. 5 showing the B-mechanism of the shutter.
Figure 7:
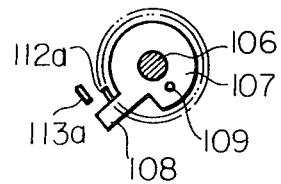
FIG. 7 is a plan view showing the actuator disc of the shutter in one phase of the operation thereof.
Figure 8:
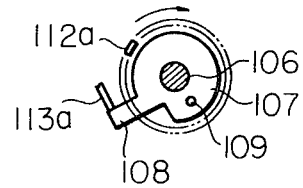
FIGS. 8 to 10 are views similar to FIG. 7 but showing the various phases of the operation of the actuator disc.

A lever 127 is pivoted on a shaft 126 and normally urged in the clockwise direction by a spring 128 provided around the shaft 126 with its one end secured to the lever 127 while the other end is secured to a stationary pin 128′. The lever 127 is provided with a raised portion 127b having an inclined edge. A lever 131 is pivoted about a shaft 129 and normally biased counterclockwise by a spring 130 secured to the lever 131 and to a stationary pin 130′. The lever 131 is provided with a raised portion 131b which engages with the peripheral edge of a cam disc 132 having a recess 132a in the peripheral edge thereof. The cam disc 132 is secured to the shaft 121 on which the shutter speed dial 120 and the shutter speed adjusting cam 119 are fixedly mounted. The angular position of the recess 132a of the cam disc 132 is so determined that it engages with the raised portion 131b of the lever 131 when the shutter speed dial 120 is set to the B-speed. The relative positions of the levers 124, 127 and 131 are so determined that, when the dial 120 is set to any shutter speed other than the B-speed, that is, when the raised portion 131b of the lever 131 engages with any portion of the peripheral edge of the cam disc 132 other than the recess 132a, the lever 131 is swung clockwise against the action of the spring 130 so that the free end 131a of the lever 131 moves out of the raised portion 127b of the lever 127 thereby permitting the lever 127 to be rotated in the clockwise direction by the action of the spring 128 so as to move the free end 127a thereof into the path of movement of the rearward portion 124a of the lever 124 to arrest the upstanding lug 124b spaced from the anchor 118 and allow the actuation of the governor mechanism. However, when the shutter speed dial 120 is set to the B-speed so that the raised portion 131b engages with the recess 132a of the cam disc 132 as shown in FIG. 6, the lever 131 is rotated counter-clockwise so that the free end 131a thereof rides over the raised portion 127b of the lever 127 so as to rotate the lever 127 counter-clockwise. This causes the free end 127a of the lever 127 to be moved out of the path of movement of the rearward end portion 124a of the lever 124 to permit the lever 124 to be swung freely so that the upstanding lug 124b is allowed to engage with the anchor 118 to prevent the actuation of the governor mechanism when the lever 124 is swung in the clockwise direction by the actuation of the release member 113, while the tail end 114a is moved slightly in the path of movement of the projection 108 of the disc 107 by means of the cam 119.

Figure 9:
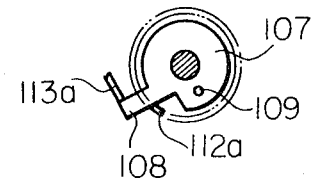

In operation, the spring 111 is first stressed by rotating the gear 110 together with the member 112 so that the depending arm 112a thereof abuts against the projection 108 as shown in FIG. 9. When the dial 120 is set to any shutter speed except the B-speed, the cam 119 adjusts the angular position of the sector gear 114 for determining the time in which the governor mechanism is actuated by the engagement of the tail end 114a with the projection 108 so as to obtain the selected shutter speed when the disc 107 is rotated, while the free end 127a is located in the path of movement of the rearward end portion 124a.

When the release member 113 is actuated, the arm 113a disengages from the projection 108 to allow the disc 107 to be rotated by the spring 111. As the disc 107 rotates, the shutter blades 103a, 103b are opened by the pin 102 of the lever 101 through the engagement of the pin 109 of the disc 107 with the elongated hole 105 of the lever 101.

Figure 10:
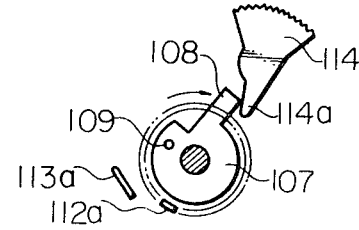

During the rotation of the disc 107, the tail end 114a engages with the projection 108 as shown in FIG. 10 to actuate the governor mechanism for obtaining the selected shutter time, the anchor 118 being freely actuated, because the upstanding lug 124b is spaced from the anchor 118 by the free end 127a of the lever 127 located in the path of movement of the rearward end portion 124a of the lever 124. After the projection 108 disengages from the tail end 114a, the disc 107 is rotated quickly until the projection 108 abuts against the opening arm 112a so that the shutter blades 103a, 103b are closed to terminate the exposure. When the release member 113 is returned to its initial position, the lever 124 is also returned to its initial position by means of the lug 113c of the member 113.

In accordance with the present invention, the provision of the lever 124 insures the exact operation of the B-speed at which the shutter blades 103a, 103b are held opened upon actuation of the release member 113 until the same is released.

When the dial 120 is set to the B-speed, the recess 132a of the cam disc 132 engages with the raised portion 131b of the lever 131 so that the lever 131 is rotated counterclockwise by the action of spring 130 and free end 131a rides over the raised portion 127b of the lever 127 as shown in FIG. 6 thereby rotating the lever 127 against the action of the spring 128 so as to move the free end 127a of the lever 127 out of the path of movement of the rearward end portion 124a of the lever 124. At the same time, the sector gear 114 is so positioned by the shutter speed adjusting cam 119 that the tip of the tail end 114a is located in the path of movement of the projection 108. Thus, when the release member 113 is actuated, the lever 124 is moved in the clockwise direction to arrest the anchor 118 with its upstanding lug 124b while the projection 108 is disengaged from the arm 113a to rotate the disc 107 until the projection 108 is arrested by the tail end 114a of the sector gear 114 during the rotation of the disc 107 so as to stop the rotation of the disc 107 because the operation of the governor mechanism is prevented by the engagement of the anchor 118 with the upstanding lug 124b. Since the shutter blades 103a, 103b are opened by the rotation of the disc 107, the shutter blades 103a, 103b are held opened until the further rotation of the disc 107 is allowed. When the member 113 is released to terminate the exposure, the lever 124 is returned to its initial position to free the anchor 118 so that the governor mechanism is actuated by the force applied by the projection 108 to the tail end 114a so as to move the sector gear 114 thereby permitting the projection 108 to be disengaged from the tail end 114a and allowing the further rotation of the disc 107.

Thus, the shutter blades 103a, 103b are closed to terminate the exposure.

FIGS. 7 – 10 show the various phases of the operation of the depending arm 112a of the member 112, the arm 113a of the release member 113 in connection with the actuator disc 107 and the sector gear 114.

I claim:

1. An automatic exposure system for a photographic camera, which comprises:
   an electric circuit including, in series connection, a source of d.c. potential;
   a photo-electric element for receiving illumination from the scene to be photographed;
   a galvanometer whose deflection is proportional to the illumination falling on said photo-electric element;
   a plurality of current-limiting resistors, each having a resistance value to limit the current flowing through said galvanometer to a different, predetermined value corresponding to a predetermined diaphragm aperture; and
   switch means, operably coupled to the shutter-speed selecting mechanism on said camera, for selecting a particular one of said plurality of resistors, said automatic exposure system further comprising:
   means, responsive to the instantaneous deflection of said galvanometer, for adjusting the aperture of said diaphragm;
   at least one pair of contacts on said resistor selecting switch means for deflecting the needle of said galvanometer to an extreme position, without the range of normal galvanometer travel, to inhibit operation of the camera shutter if an erroneous attempt is made to operate said shutter with said shutterspeed selecting mechanism set to the "-bulb" position;
   means for opening the shutter of said camera for a predetermined interval of time, said means including,
   an actuator disc biased for rotation about a fixed shaft by the shutter cocking mechanism of the camera, to open said shutter;
   a pivoted, segmental gear engaging an extension on said disc to establish the interval during which said shutter is open;
   means, coupled to said shutter speed selecting mechanism, for controlling the angular rotation of said gear; and
   a governor, coupled to said segmental gear, for regulating the rate of rotation thereof, said system further comprising:
   a first pivoted lever having a portion engaging said governor, to inhibit rotation thereof when said shutter release is operated; and
   a second pivoted lever, coupled to said shutter speed selecting mechanism, for moving said first lever out of engagement with said governor-inhibiting first lever when said speed selecting mechanism is set to any speed other than "bulb".

2. The automatic exposure system according to claim 1, wherein said at least one pair of contacts establishes a short circuit across said galvanometer whereby the deflection thereof falls to a value corresponding to the condition where insufficient light is received by said photo-electric element for proper exposure with a normal shutter speed setting.

3. The automatic exposure system according to claim 1 wherein said at least one pair of contacts establishes an open circuit in the series connection to said galvanometer, whereby the deflection thereof falls to a value corresponding to the condition where insufficient light is received by said photo-electric element for proper exposure with a normal shutter speed setting.

* * * * *